United States Patent [19]

Cariou et al.

[11] Patent Number: 4,961,994
[45] Date of Patent: Oct. 9, 1990

[54] PROTECTIVE COATED COMPOSITE MATERIAL

[75] Inventors: Frank E. Cariou, Cherry Hill, N.J.; Theodore A. Harris, Jr., Philadelphia, Pa.

[73] Assignee: General Electric Company, King of Prussia, Pa.

[21] Appl. No.: 133,774

[22] Filed: Dec. 16, 1987

[51] Int. Cl.$^5$ .............................................. B32B 9/00
[52] U.S. Cl. .................... 428/408; 428/411.1; 428/413; 428/469; 428/702
[58] Field of Search ............... 428/461, 469, 500, 702, 428/912.2, 428

[56] References Cited

U.S. PATENT DOCUMENTS

| | | | |
|---|---|---|---|
| 3,671,205 | 6/1972 | Uchida et al. | 29/195 |
| 3,716,869 | 2/1973 | Gould, Jr. et al. | 343/779 |
| 3,821,013 | 6/1974 | Daley et al. | |
| 3,916,418 | 10/1975 | Erdmann et al. | 343/912 |
| 4,115,177 | 9/1978 | Nelson | 156/245 |
| 4,123,308 | 10/1978 | Nowlin | 156/275.5 |
| 4,158,079 | 6/1979 | Severus-Laubenfeld | 428/172 |
| 4,166,876 | 9/1979 | Chiba et al. | 428/215 |
| 4,320,169 | 3/1982 | Yatabe et al. | 428/333 |
| 4,333,985 | 6/1982 | Shirahata et al. | 428/336 |
| 4,337,476 | 6/1982 | Fraser et al. | 357/67 |
| 4,341,841 | 7/1982 | Ohno et al. | 428/414 |
| 4,448,855 | 5/1984 | Senaha et al. | 428/632 |
| 4,450,201 | 5/1984 | Brill et al. | 428/336 |
| 4,465,577 | 8/1984 | Tanielian | 204/192 |
| 4,686,150 | 8/1987 | Talley et al. | 428/593 |

FOREIGN PATENT DOCUMENTS

| | | |
|---|---|---|
| 0151985 | 1/1985 | European Pat. Off. . |
| 0183052 | 10/1985 | European Pat. Off. . |
| 0187458 | 11/1985 | European Pat. Off. . |
| 2008266 | 9/1971 | Fed. Rep. of Germany . |
| 879380 | 3/1959 | United Kingdom . |
| 998584 | 9/1961 | United Kingdom . |
| 1075094 | 12/1963 | United Kingdom . |
| 1101408 | 5/1966 | United Kingdom . |
| 1185939 | 10/1968 | United Kingdom . |
| 1266452 | 3/1969 | United Kingdom . |
| 1307642 | 4/1970 | United Kingdom . |
| 1349731 | 4/1971 | United Kingdom . |
| 1367590 | 1/1973 | United Kingdom . |
| 1544815 | 4/1979 | United Kingdom . |

OTHER PUBLICATIONS

"Radio Frequency Components of Carbon Fiber Reinforced Plastic for Satellite Payloads," *Frequenz*, 35 (1981), 6, pp. 155–162.

"Optimized Design and Fabrication Process for Advanced Composite Spacecraft Structure," by V. F. Mazzio et al., *17th Aerospace Sciences Meeting*, New Orleans, La., Jan. 15–17, 1979, pp. 1–8.

"Advanced Composite Antenna Reflectors for Communications Satellites," by R. N. Gounder, *28th National SAMPE Symposium*, Apr. 12–14, 1983, pp. 678–686.

*Primary Examiner*—George F. Lesmes
*Assistant Examiner*—J. M. Gray
*Attorney, Agent, or Firm*—Raymond E. Smiley; Ernest F. Chapman

[57] ABSTRACT

An improved composite material which overcomes the moisture problem associated with other composite materials includes a protective waterproof coating of material such as a poly-para-xylylene over the composite material.

2 Claims, 1 Drawing Sheet

PROTECTIVE COATED COMPOSITE MATERIAL

BACKGROUND OF THE INVENTION

This invention relates to composite materials and more particularly to a protective coating for composite materials.

Graphite-epoxy materials and other composite materials containing graphite fibers, are widely used in spacecraft to form structural members and other parts, because of their unique combination of very high mechanical strength, light weight (low physical density) and good resistance to elevated temperatures. These materials display three disadvantages, however, in such applications. A first disadvantage is due to their dark coloration, which is generally gray to black; as a result, these materials tend to be strong absorbers of solar radiation, which leads to difficulties in thermal stabilization of the spacecraft made of this material.

A second disadvantage is due to their organic material content. They are susceptible to both physical degradation (erosion damage) and chemical degradation (carbonization and other compositional changes) caused by bombardment by ozone, ionic and atomic oxygen, and other gaseous or high energy particles under orbital conditions, especially at lower altitudes. Oxygen presents the worst problem because of its high chemical affinity for most organic materials, including carbon itself. These composite materials are also easily burned through by impinging laser beams, since they are not truly refractory. A third disadvantage is that, under ordinary conditions of temperature, and humidity, these materials, being somewhat porous, tend to absorb comparatively large quantities of water (up to 1.5% by weight) after part fabrication and installation aboard a spacecraft. The water absorbed on the surface spreads quickly throughout the epoxy matrix, by diffusion processes enhanced by capillary effects along the embedded graphite fibers. In effect, this water simulates the water of hydration in an inorganic crystalline material such as copper sulfate. Subsequently, in the vacuum of space, much of the moisture is gradually desorbed in the form of water vapor. This exudation of water can cause spacecraft contamination and, much worse, structural damage in the form of component weakening, shrinkage, and warping, with resultant distortion of the spacecraft installations. Similarly, if the water freezes within the epoxy matrix, due to the low temperatures, it can cause cracking or fracturing of the component. For example, such disturbances would constitute a serious drawback in optical systems which require precision alignment for proper performance.

It is known that thermal stabilization can be achieved by depositing an opaque coating of a highly reflective material such as silver, aluminum, magnesium or gold on the surface. While this may correct the heating problem, the chemical degradation and physical damage caused by bombardment with zone, ionic and atomic oxygen and other gaseous and high energy particles under low earth orbit conditions, can cause erosion and destruction of such a coating. It has been proposed to provide a metal oxide protective coating over the reflective coating and also a metal oxide subcoating to smooth out the surface for the reflective material coating. This thin coating may be of a very chemically stable, optically transparent, hard refractory metal oxide such as $Al_2O_3$ (aluminum oxide), $SiO_2$ (silicon dioxide), $TiO_2$ (titanium dioxide), or $MgO$ (magnesium oxide). These oxides are very resistant to mechanical damage (scratching and pitting) because of their high Brinell hardness.

These configurations provide protection against solar radiation and the physical degradation and chemical degradation caused by bombardment by ozone, ionic and atomic oxygen, and other gaseous or high energy particles under low earth orbit conditions. These configurations do not provide for protection from earth-based absorption of large quantities of moisture which is subsequently gradually desorbed in the vacuum of space in the form of water vapor. This can cause spacecraft contamination as well as structural damage or misalignment.

SUMMARY OF THE INVENTION

In accordance with one embodiment of the present invention, the moisture problem associated with graphite epoxy or other such composite materials, can be overcome by providing a waterproofing layer over the composite material.

DESCRIPTION OF PREFERRED EMBODIMENTS OF THE INVENTION

Figure 1:
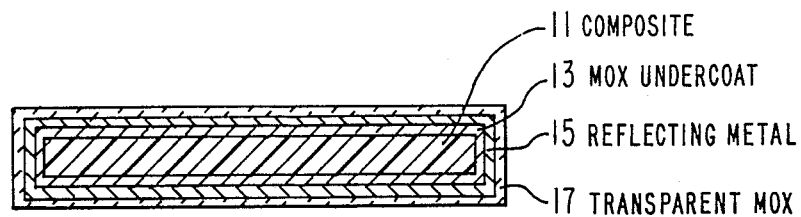
FIG. 1 is a sectional sketch of a graphite epoxy composite material with a metal-oxide (mox) undercoat, an optically-reflecting, metal intermediate layer and a protective, optically-transparent, metal-oxide (mox) top coat in accordance with one embodiment of the present invention.

Referring to FIG. 1, there is illustrated a composite graphite epoxy material 11 coated with a first metal-oxide (mox) undercoat 13 that is 50–5000 Å (angstroms) thick followed by an optically-reflecting metal intermediate layer 15 that is 500 to 5,000 Å thick followed by a top coat of optically-transparent metal-oxide (mox) 17 that is 50 to 1,000 Å thick. The optically reflecting metal in the intermediate layer which is 500 to 5000 Angstroms thick is of high reflectance material such as silver, aluminum, magnesium, or gold.

The overcoat over this reflecting material or topcoat is an optically-transparent metal oxide 17 which could be a metal oxide such as aluminum oxide, silicon dioxide, titanium dioxide, magnesium dioxide, tantalum pentoxide or niobium pentoxide. In the prior art, a metal oxide undercoat 13 has been utilized to condition the composite material surface prior to deposition of the reflecting material for thermal control. The graphite epoxy materials generally have a rather rough matte surface so that the reflectance of a directly deposited metal overcoat is highly diffuse, rather than specular, as is the case when this same material is deposited on a smooth surface, such as plate glass or quartz. This diffuse scattering effect substantially lowers the reflectance from its normally high intrinsic value at a given wavelength. Since the solar radiative power is peaked at about 0.48 microns, the net result is that the solar absorbance $\alpha$ is adversely affected (namely, increased) with a corresponding deleterious effect on the important ratio $\alpha/\epsilon$ ($\epsilon$ is the normal thermal emittance). However, by application of a thin metal oxide layer, the specularity of the reflectance is greatly enhanced so the $\alpha$ is considerably reduced, thereby improving the thermal-optical properties of the coating. However, the simple application of a thin metal oxide does not mean that a moistureproofing layer has been established.

In accordance with the teachings herein, it is desired that this inner sublayer also be a moistureproofing layer and therefore, what is desired is a pinhole free, nonepitaxial, amorphous and uniform coating on all surfaces of the composite material. This layer also serves as a highly-impermeable waterproof coating layer. It will therefore prevent, or at least greatly retard, the absorption of moisture by the composite material. This oxide coating should be applied to the graphite epoxy surface shortly after the material has been carefully dehydrated and shaped to its desired final form. The preferred method of deposition is by magnetron sputtering assisted by ion plating, which best assures good adherence, intimate contact with, and uniform coverage of, all surfaces even of large parts to be coated. The incorporation of variable substrate bias and ion plating features will further ensure that low stress, very compact and adherent, grain free films are deposited. Other deposition techniques that are also amenable to production of high-quality films, such as electron beam evaporation, may be used. In either case, appropriate substrate holders, which can be rotated and revolved during film deposition, will enhance the desired film characteristics, especially thickness uniformity and continuous coverage.

In accordance with another and a preferred embodiment of the present invention, the undercoat layer in immediate contact with the graphite-epoxy surface is a thin layer of an impermeable and very chemically inert polymer such as poly-para-xylylene. The dimer material used to make these polymer films may be purchased from Union Carbide under the trademark "Parylene". This poly-para-xylylene can be vacuum deposited as a moisture barrier sealant coating, as represented by layer 23 over the graphite epoxy 22 in FIG. 2. This Parylene TM undercoating may be anywhere from 200 to 250,000 Angstroms thick.

This polymer can also be used to precoat the graphite fibers themselves before they are incorporated into the epoxy matrix material. Under properly controlled deposition conditions (vapor pressure, deposition, substrate temperature, for example) poly-para-xylylene forms very dense, continuous pinhole free and grain boundary free amorphous or single crystal films with excellent moisture resistance even in films as thin as 200 Angstroms. Because of the mechanism of polymer growth, it uniformly covers even the smallest surface artifacts (pits, protrusions, etc.) and grain boundaries in the substrate with no shadowing effects. Poly-para-xylylene will also accept, with excellent adherence, overcoats of other materials such as the metals and metal oxides as described above. This polymer can withstand and be used at continuous temperatures as high as 250° C. and is almost completely impervious to chemical attack by both organic and inorganic chemicals, including strong mineral acids and bases. The preferred method of deposition of this polymer is by thermal sublimation of the crystalline dimer, thermal cleavage of the dimer into highly reactive monomer-di-radicals, followed by spontaneous polymerization onto the substrate surface maintained at a temperature ranging from $-50°$ C. to $+50°$ C. However, variations on this basic method are also possible.

Figure 2:
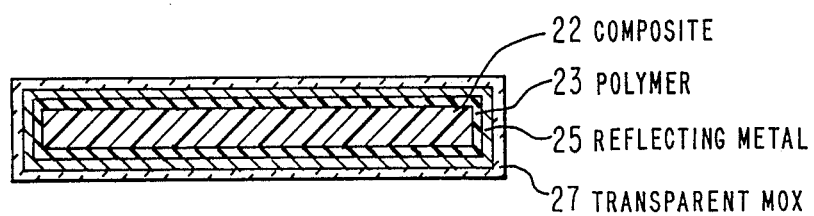
FIG. 2 is a cross sectional view of the graphite epoxy composite with a first overcoat of a Parylene TM polymer material, an optically-reflecting, metal intermediate layer and an outer, optically-transparent metal-oxide (mox) layer in accordance with a second embodiment of the invention.

As shown in FIG. 2, over this poly-para-xylylene subcoat or undercoat layer 23 which may be from 200 to 250,000 Angstroms thick is the optically-reflecting metal intermediate layer 25 which is 500 to 5000 Angstroms thick and above that layer is the optically-transparent metal oxide top coat layer 27 which, for example, may be 50 to 1000 Angstroms thick.

Figure 3:
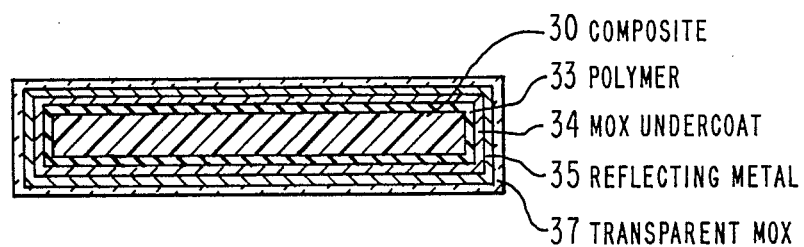
FIG. 3 is a cross sectional view of composite material with a Parylene TM polymer first coat, a metal-oxide (mox) coat, a metal-reflecting layer and an optically-transparent metal-oxide (mox) top coat in accordance with a third embodiment of the invention.

A third configuration is illustrated in FIG. 3. Again, it has the Parylene TM subcoat 33 over the graphite epoxy composite material 30. Between the reflecting layer 35 and the Parylene TM subcoat layer 33 there is the metal-oxide surface-conditioning layer 34 which aids in preparing the surface for the reflecting metal layer 35. Further, in accordance with the third embodiment, there is the optically transparent metal oxide top coat layer 37.

These films are all economical to produce, since they involve only relatively low cost materials and employ deposition techniques which are well established and readily available in most thin film laboratories. The combination of films produced are superior to known coatings in most respects, and in particular, afford much better moisture protection than, for example, dip coatings. These films are readily applicable to other surfaces which need similar protection against erosion, chemical change and moisture sensitivity, such as optical reflectors and sensitive electronic components.

We claim:

1. A protective coated composite material consisting essentially of:
    a graphite-epoxy composite material or a composite material containing graphite fibers,
    a poly-para-xylylene waterproofing layer over said composite material,
    a metal oxide layer over said waterproofing layer,
    a third layer of a reflecting metal over said metal oxide layer, and
    a second metal oxide layer over said third layer.

2. The combination of claim 1 wherein said poly-para-xylylene is deposited by thermal sublimation of the crystalline dimer, thermal cleavage of the dimer into highly reactive monomer-di-radicals, followed by spontaneous polymerization onto the surface of said composite material maintained in the temperature range of $-50°$ C. to $+50°$ C.

* * * * *